(12) United States Patent
Weber

(10) Patent No.: US 9,292,487 B1
(45) Date of Patent: Mar. 22, 2016

(54) DISCRIMINATIVE LANGUAGE MODEL PRUNING

(75) Inventor: Frederick V. Weber, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 13/587,799

(22) Filed: Aug. 16, 2012

(51) Int. Cl.
*G06F 17/27* (2006.01)
*G06F 13/00* (2006.01)
*G10L 15/00* (2013.01)

(52) U.S. Cl.
CPC ...................................... *G06F 17/27* (2013.01)

(58) Field of Classification Search
CPC .......... G06F 17/27; G06F 13/00; G10L 15/00
USPC .................................. 704/2, 9, 257, 240, 255
See application file for complete search history.

(56) References Cited

U.S. PATENT DOCUMENTS

| | | | | |
|---|---|---|---|---|
| 6,513,005 B1 * | 1/2003 | Qin | ...................... | G06K 9/6293 704/231 |
| 6,789,231 B1 | 9/2004 | Reynar et al. | | |
| 7,406,416 B2 * | 7/2008 | Chelba | .................. | G06F 17/277 704/240 |
| 7,774,197 B1 * | 8/2010 | Bulyko | ................ | G06F 17/2715 704/255 |
| 8,260,614 B1 | 9/2012 | Zhao et al. | | |
| 8,301,436 B2 * | 10/2012 | Wang | .................. | G10L 15/1822 704/231 |
| 8,311,825 B2 * | 11/2012 | Chen | ........................ | G06K 9/72 704/240 |
| 8,589,163 B2 | 11/2013 | Ljolje et al. | | |
| 8,595,004 B2 * | 11/2013 | Koshinaka | .............. | G10L 15/06 704/231 |
| 2003/0187649 A1 * | 10/2003 | Logan | ............... | G06F 17/30017 704/260 |
| 2004/0193408 A1 | 9/2004 | Hunt | | |
| 2005/0216265 A1 * | 9/2005 | Chelba | .................. | G06F 17/277 704/240 |
| 2005/0228670 A1 | 10/2005 | Mahajan et al. | | |
| 2007/0038450 A1 | 2/2007 | Josifovski | | |
| 2007/0078653 A1 * | 4/2007 | Olsen | ..................... | G10L 15/197 704/240 |
| 2008/0281593 A1 | 11/2008 | Deligne et al. | | |
| 2009/0076817 A1 | 3/2009 | Jeon et al. | | |
| 2009/0099841 A1 * | 4/2009 | Chen | ........................ | G06K 9/72 704/9 |
| 2009/0112596 A1 * | 4/2009 | Syrdal et al. | .................. | 704/260 |
| 2010/0211390 A1 | 8/2010 | Hillebrecht et al. | | |
| 2013/0191126 A1 | 7/2013 | Thambiratnam et al. | | |
| 2014/0195238 A1 * | 7/2014 | Terao | ...................... | G10L 15/02 704/251 |

OTHER PUBLICATIONS

Hall, "Best-first Word-lattice Parsing: Techniques for intergrated syntactic language modeling", May 2005, Brown University, dissertation for the degree of Doctor of Philosophy, pp. 1-104.*

Stolcke, "Entropy-based Pruning of Backoff Language Models", Jun. 2000, SRI International.*

(Continued)

*Primary Examiner* — Pierre-Louis Desir
*Assistant Examiner* — Seong-Ah A Shin
(74) *Attorney, Agent, or Firm* — Knobbe, Martens, Olson & Bear, LLP

(57) ABSTRACT

A language model for speech recognition may be discriminatively pruned. In some embodiments, the language model is discriminatively pruned by computing a discriminative objective function value for one or more n-grams in the language model, and selecting one or more n-grams to prune based at least in part on a threshold value. In some embodiments, the language model is discriminatively pruned to a sufficiently small number of n-grams such that transcription of audio inputs may occur in real time, or such that the pruned language model may be stored on a device with relatively limited electronic storage capacity.

30 Claims, 8 Drawing Sheets

(56) References Cited

OTHER PUBLICATIONS

Chen et al., "An Empirical Study of Smoothing Techniques for Language Modeling", Jun. 1996, Annual Meeting of the ACL.*
Sagae, et al., Hallucinated N-Best Lists for Discriminative Language Modeling, IEEE 2012, pp. 5001-5004.
Rastrow, et al., Acoustically Discriminative Language Model Training with Pseudo-Hypothesis, SciVerse ScienceDirect, Speech Communication, 2012, pp. 219-228.
Printz, et al. Theory and Practice of Acoustic Confusability, Computer Speech and Language (2001), 2001 Academic Press, 34 pages.
Kurata, et al. Acoustically Discriminative Training for Language Models, IBM Research, Tokyo Research Laboratory, IBM Japan, Ltd., ICASSP 2009, pp. 4717-4720.
Stolcke, Andreas, Entropy-based Pruning of Backoff Language Models, Speech Technology and Research Laboratory, SRI International, 1998, 5 pages.

* cited by examiner

BASE PROBABILITIES, AUDIO INPUT "CAT IS SLEEPING"

| 310 | | PATH PROB. | L.M. PROB. |
|---|---|---|---|
| (TRUTH) | "CAT IS SLEEPING" | 0.60 | 0.025 |
| | "CAT IS SWEEPING" | 0.15 | 0.003 |
| | "PAT IS SLEEPING" | 0.15 | 0.008 |
| | "PAT IS SWEEPING" | 0.10 | 0.012 |

PRUNED PROBABILITIES, "CAT IS SLEEPING" N-GRAM PRUNED

| 320 | | PATH PROB. | L.M. PROB. |
|---|---|---|---|
| (TRUTH) | "CAT IS SLEEPING" | 0.52 | 0.018 |
| | "CAT IS SWEEPING" | 0.18 | 0.003 |
| | "PAT IS SLEEPING" | 0.18 | 0.008 |
| | "PAT IS SWEEPING" | 0.12 | 0.012 |

*Fig.3A.*

BASE PROBABILITIES, AUDIO INPUT "PAT IS SWEEPING"

| 330 | | PATH PROB. | L.M. PROB. |
|---|---|---|---|
| (ERROR) | "CAT IS SLEEPING" | 0.10 | 0.025 |
| | "CAT IS SWEEPING" | 0.14 | 0.003 |
| | "PAT IS SLEEPING" | 0.14 | 0.008 |
| (TRUTH) | "PAT IS SWEEPING" | 0.62 | 0.012 |

PRUNED PROBABILITIES, "CAT IS SLEEPING" N-GRAM PRUNED

| 340 | | PATH PROB. | L.M. PROB. |
|---|---|---|---|
| (ERROR) | "CAT IS SLEEPING" | 0.06 | 0.018 |
| | "CAT IS SWEEPING" | 0.15 | 0.003 |
| | "PAT IS SLEEPING" | 0.15 | 0.008 |
| (TRUTH) | "PAT IS SWEEPING" | 0.64 | 0.012 |

*Fig.3B.*

DISCRIMINATIVE LANGUAGE MODEL PRUNING

BACKGROUND

Language models and acoustic models may be used to facilitate speech recognition. For example, an acoustic model may be used to identify phonemes or other subword units present in an utterance. A language model may then be used to convert the phonemes or other sound units identified by the acoustic model into words, phrases, and the like. Language models may be generated by analyzing a large corpus of text to determine the frequency with which a sequence of n words (or "n-gram") appears in the text. Probabilities for an n-gram in the language model may be computed by determining the conditional probability of the final word of the n-gram appearing in the corpus given that the previous words of the n-gram have been found. This probability can be used to identify audio inputs with the use of a speech recognizer. For example, a speech recognizer may receive an audio input that may correspond to two or more possible word sequences. The language model may be used to determine the probabilities of each of the word sequences that correspond to the audio input, and the audio input may be recognized as being the word sequence with the highest probability.

In training models for speech recognition, a maximum likelihood criterion may be applied. For example, language models may be trained to optimize a criterion based on maximum likelihood. One drawback of this approach, among others, is that a maximum likelihood criterion may not minimize the probability of word errors in speech recognition.

Additionally, in some current approaches, a language model may be pruned so that fewer n-grams are used in recognizing speech. In one current approach, a language model is pruned by removing all n-grams whose probabilities are lower than a threshold. In another current approach, a language model is pruned based on relative entropy, so that a pruned language model has a relatively similar distribution of probabilities to a base language model. One drawback of these approaches, among others, is that for a given target size of a language model, these approaches may sacrifice too much accuracy and increase the probability of word errors in speech recognition to unacceptable levels.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 3A and 3B are a pictorial diagrams depicting an illustrative base language model and a hypothetical language model in which a selected n-gram is pruned.

DETAILED DESCRIPTION

Overview of the Present Disclosure

Figure 1:
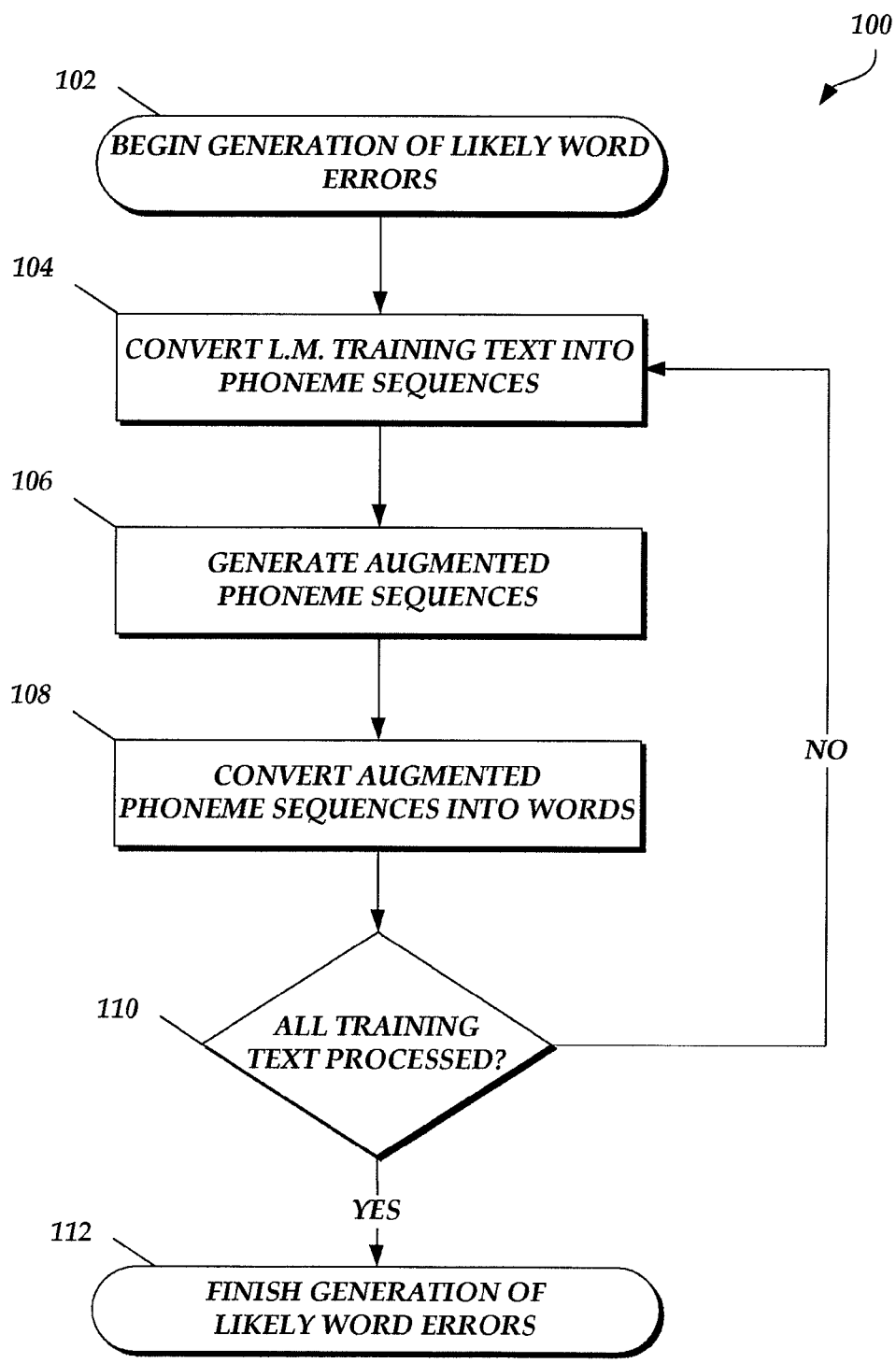
FIG. 1 is a flow diagram depicting an illustrative routine for generating likely word errors.

Generally described, aspects of the present disclosure are directed to discriminative language model pruning. Accordingly, a discriminative language model pruning service is disclosed. In one embodiment, a base language model is obtained or generated by the model pruning service. This base language model, which may contain thousands or even millions of n-grams, may be pruned according to a criterion derived from a discriminative objective function value computed for each n-gram. Advantageously, by discriminatively pruning the base language model, the number of n-grams in the language model may be sufficiently reduced that speech recognition using the language model may be performed relatively quickly while maintaining a relatively high degree of accuracy. In some embodiments, n=3, such that the base language model and discriminatively pruned language model comprise a plurality of trigrams. However, n may be varied among the natural numbers as desired.

Using techniques known in the art, a base language model may be generated from a corpus of training text. The corpus of training text may contain many different types of text, or may contain specific types of text, such as electronic mail messages, text messages, instant messages, text documents, etc. The training text may be broken down into n-grams, which are ordered n-word sequences. Probabilities may be assigned to each n-gram in the language model. These probabilities may represent the probability that the final word of an n-gram appears in the training text given that all of the previous words in the n-gram have appeared in order in the training text.

Language models may be general-purpose language models, or may be application-specific. For example, a language model generated from a corpus of instant messages may be used to transcribe speech and to generate transcriptions for use with an instant messaging application. It should be noted that instead of generating a base language model, the model pruning service may instead use a previously-generated base language model obtained by the model pruning service. A base language model may itself have been previously pruned. For example, the base language model may have been previously pruned discriminatively according to aspects of the present disclosure (e.g., iterated discriminative pruning), or the base language model may have been previously pruned according to entropy-based techniques or other pruning techniques known in the art.

Overview of Speech Recognition

A speech recording may be processed by a speech recognizer to generate one or more recognition hypotheses, and each hypothesis may be associated with a probability that it corresponds to the words spoken in the speech recording. Because a speech recognizer may make errors in recognizing words, having more than one hypothesis may provide information about other possible correct words. The recognition hypotheses may be stored in various data structures, such as a top-N list or lattice. Each entry of a top-N list may be a list of recognition hypotheses and the list may be ordered such that the most probable hypothesis is at the top of the list.

Figure 3C:
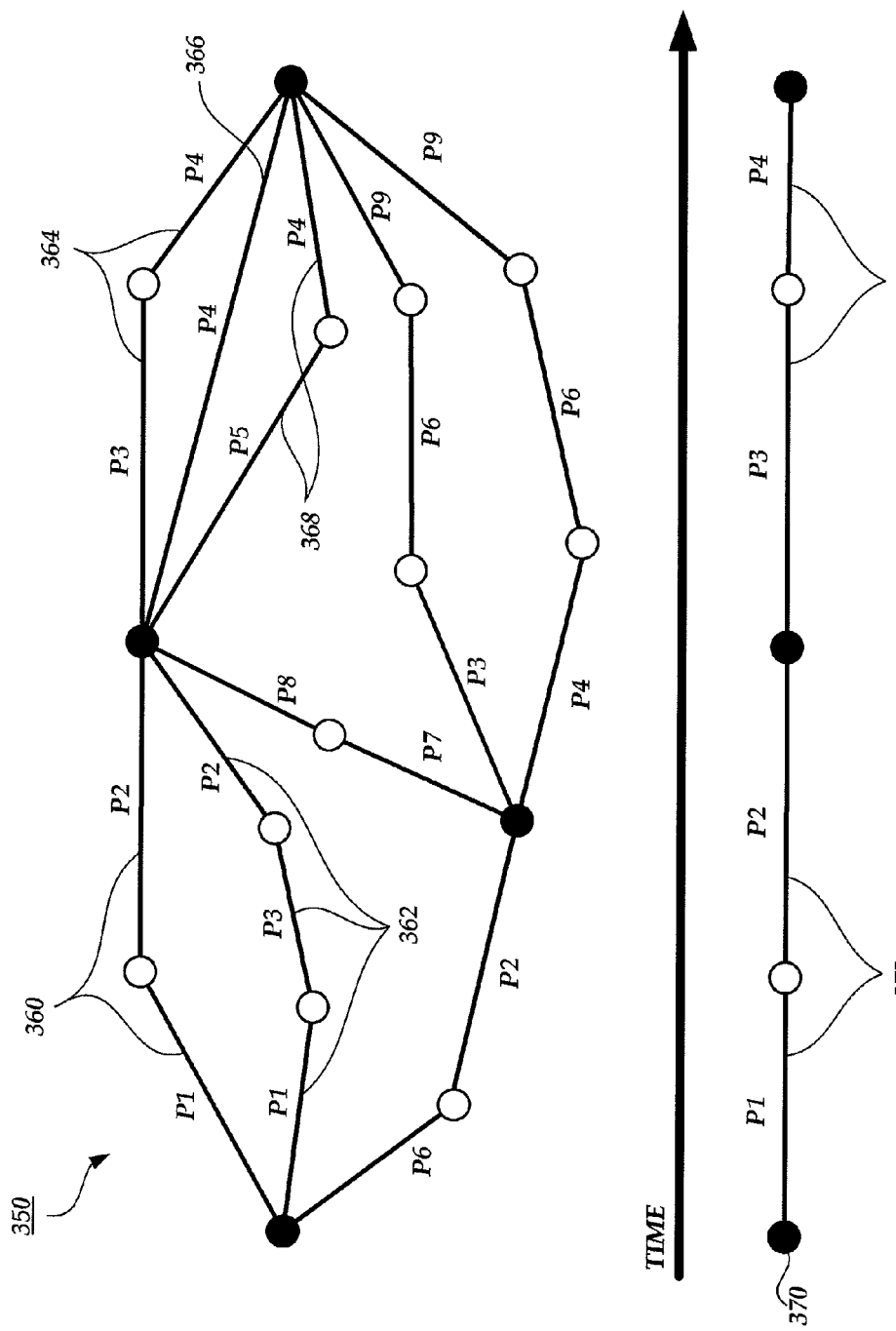
FIG. 3C is a pictorial diagram depicting an illustrative lattice.

A lattice may store the recognition hypothesis in a more compact data structure, and an example of a lattice is shown in FIG. 3C. A lattice may be a directed acyclic graph where the segments (or arcs) are associated with recognized words (or subword units) in the hypotheses and the arcs are joined at nodes. Each segment may be associated with a probability that the word associated with the segment is a correct word. Each path through the lattice may correspond to a recognition hypothesis. The lattice may be a more compact representation since common words in the recognition hypotheses may be represented by a single segment. For example, if all of the recognition hypotheses started with the word "the," then the lattice could begin with a single segment for the word "the" and then segments for subsequent words in the hypotheses would follow the initial segment.

Language Model Training

A language model may be used to model how words are used in a language. For example, the phrase "the cat is sleeping" may be a likely sequence of words since cats often sleep, but the phrase "the cat is sweeping" may be an unlikely sequence of words since most cats do not sweep. The two previous phrases, however, are acoustically similar (in that most of the corresponding speech units are similar) so by employing a language model we can improve speech recognition by converting a sequence of speech units into the most likely corresponding words. Language models may be statistical models, and some examples of language models are maximum entropy language models and n-gram language models.

An n-gram language model comprises statistics that words appear in sequence. The number "n" is commonly three (which would be a trigram language model), but any number may be used, and represents the longest sequence for which the model assigns probabilities. A trigram language model, for example, may include statistics corresponding to single words, pairs of words in sequence, and triplets of words in sequence.

A language model is commonly trained using a large corpus of relevant documents. As a first step, an unpruned language model may be determined that includes statistics for all words in the training corpus. For example, an unpruned trigram language model may include a unigram probability for each word in the training corpus, a bigram probability for each pair of words in sequence, and a trigram probability for each triple of words in sequence.

The n-gram probabilities may be determined from counts. For example, if there are 100,000 instances of the word "the" and there are 1,000,000 words total, then the unigram probability of "the" appearing as a word may be 0.1. If there are 100,000 instances of the word "the" and 100 instances of the pair "the cat," then the probability that the word "cat" follows the word "the" may be 100/100,000, which equals 0.001. If there are 100 instances of the pair "the cat" and 10 instances of "the cat is," then the probability that "is" follows "the cat" may be 10/100, which equals 0.1.

The n-gram probabilities generated from a training corpus are approximations of the actual n-gram probabilities for a language. Generally, the accuracy of the n-gram probabilities increases as the size of the training corpus increases. The accuracy of individual n-gram probabilities may depend on the number of corresponding counts used in generating the n-gram probability. For example, for a common word, such as "the," the unigram probability will likely be accurate as there will be many examples. For an uncommon word, such as "armadillo," there may be no examples of the word in the training corpus, so the unigram probability may be zero although the word is sometimes used. Generally, unigram probabilities are more accurate than bigram probabilities; bigram probabilities are more accurate than trigram probabilities, and so forth.

Backoff and smoothing techniques may be used to improve the estimates of the n-gram probabilities. Backoff techniques may be used to account for unseen n-gram probabilities (which would generate an incorrect probability of zero). For example, the triplet "the armadillo is" may not appear in the training corpus, and thus the probability of "is" occurring after "the armadillo" may be zero. To provide a non-zero probability, the trigram may be backed off to a bigram with a backoff weight as a penalty. The missing trigram probability may be replaced by a product of a backoff weight and the bigram probability for "is" occurring after "armadillo." If the bigram probability is nonzero, then this may be a suitable estimate. If the bigram probability is also zero, then the bigram may be further backed off to a unigram. The bigram probability may be replaced by a product of another backoff weight (which may be different) and the unigram probability for "is." Smoothing techniques, such as Good-Turing smoothing, may be used to adjust n-gram probabilities for unseen or rarely seen n-grams. For example, the probability of some seen n-grams may be reduced and transferred to some unseen n-grams to reduce the number of n-grams that have zero probability.

An unpruned language model may be pruned to create a pruned language model. A pruned model may also be pruned further. Pruning may decrease the size of the language model and allow the language model to be used with devices with smaller memories or storage. For example, a language model could be pruned by removing all trigrams whose probabilities are lower than a threshold or by removing trigrams that minimize a relative entropy difference between pruned and unpruned language models.

Discriminative Pruning of Language Models

As discussed above, aspects of the present disclosure are directed to discriminatively pruning language models. In training models for speech recognition, a maximum likelihood criterion may be applied. For example, acoustic models and language models may be trained to optimize a criterion based on maximum likelihood. The maximum likelihood criteria, however, may not minimize the probability of word errors in speech recognition. To improve the accuracy of speech recognition, discriminative training may be used instead of maximum likelihood training.

Discriminative training may be based on minimizing errors in a training corpus. For example, an acoustic model may be discriminatively trained. In discriminatively training an acoustic model, a speech recognizer may be used to create a lattice (or similar output) for each utterance in an acoustic model training corpus. The lattice may contain the correct transcription (in words, phonemes, and/or other subword units) and other hypotheses that contain likely speech recognition errors. The discriminatively trained acoustic model may minimize the probability that the subword units of the correct transcription are misrecognized as the subword units of the hypotheses with errors.

To discriminatively prune a language model, information about likely word errors may be used. In some embodiments, likely word errors may be generated by performing speech recognition on transcribed audio and obtaining a list of hypotheses with likely word errors as determined by the speech recognizer. These likely word errors, as well as the transcription, may be represented as a lattice with multiple paths, each path being associated with a path probability.

In some embodiments, likely word errors may be obtained from a corpus of language model training text using a pseudo-automatic speech recognition (pseudo-ASR) procedure. In a pseudo-ASR procedure, each text of a language model corpus may be converted into sequences of phonemes or other word subunits. While frequent reference is made herein to phonemes for illustrative purposes, one skilled in the art will appreciate that other speech units may be used as well. For example, n-phones, which are sequences of n consecutive phonemes, may be employed, such as a triphone. Other speech units may be employed as well, such as syllables.

These phoneme sequences may be augmented to generate one or more acoustically confusable phoneme sequences. In one embodiment, a phoneme confusion matrix is used to augment the phoneme sequences. These acoustically confusable phoneme sequences may then be converted into words to generate likely word errors. These likely word errors, as well as the original text, may be represented as a lattice with multiple paths, each path being associated with a path probability.

Based on the path probabilities and the language model probabilities of each n-gram in the base language model, a discriminative objective function value may be computed for each n-gram in the base language model. This discriminative objective function value may be used to determine which n-grams are pruned. In one embodiment, n-grams having a discriminative objective function value meeting a threshold are pruned. In another embodiment, the n-grams of the base language model are ranked according to their discriminative objective function values, and n-grams are selected to be pruned based on a percentile or numerical rank of the n-grams. Those skilled in the art will appreciate that in some embodiments, pruning an n-gram may refer to deleting the n-gram from the language model; flagging, ignoring, or otherwise skipping the n-gram; or more generally removing the n-gram from consideration for speech recognition (e.g., the n-gram selected for pruning is not searched over in the pruned language model when speech is recognized or transcribed).

Pruning the base language model may advantageously accelerate the speed at which speech is recognized and transcribed, and may also reduce the computational power needed to recognize speech. It may also be desirable to reduce the number of n-grams in the language model such that the pruned language model may be stored in a device with relatively low electronic storage capacity, such as a cell phone, smartphone, feature phone, or other user computing device. In other embodiments, a certain percentage of n-grams are pruned. N-grams may be selected for pruning based on their discriminative objective function value. A threshold may be set for selecting which n-grams are pruned, or n-grams may be pruned based on their ranking among all n-grams in the language model. Still other ways for selecting n-grams to prune are possible.

Aspects of the present disclosure may be practiced in a networked computing environment. For example, a computing device (e.g., a server) on which a pruned language model is stored may host a speech recognition service on a network. An audio input such as an utterance may be received from a remote computing device (e.g., a user computing device) over the network and may be transcribed by the computing device using the pruned language model. The transcribed utterance may be transmitted (e.g., as part of a text message, text document, instant message, or electronic mail message, among other formats) back to the remote computing device, or instead directly to a recipient computing device designated by a user of the remote computing device.

The pruned language model may also be distributed or transmitted over the network to user computing devices to facilitate speech recognition on those devices. For example, a user computing device may have a pruned model stored therewith. The user computing device may receive an audio input such as utterance (through a microphone or receiver, for example), and transcribe the utterance with the pruned language model. The transcription may be transmitted to a designated recipient user computing device, or displayed on a screen on the user computing device for confirmation.

Generating Likely Word Errors

Turning to FIG. 1, an illustrative routine 100 for generating likely word errors is depicted. Typically, a training corpus for a language model is large and contains only text (e.g., there may be no audio recording of the text). To discriminatively train a language model, a language model training corpus may be used to generate likely word errors. As discussed above, the corpus may include electronic mail messages; text messages; instant messages; plain text obtained from books, newspapers, periodicals, etc.; text documents; and other forms of text.

The routine begins in block 102. In block 104, the words of the language model training data are converted into a phoneme sequence (or other subword units). The conversion can be facilitated by a lexicon or spelling-to-sound rules. Embodiments are not limited to any particular methods for converting words to phonemes and any methods known to one of skill in the art may be used. The conversion can be performed on a portion of the language model data, such as a sentence or utterance, before proceeding to subsequent blocks of the routine 100, or the entire language model training data can be converted into a phoneme sequence or set of phoneme sequences. In some embodiments, a subset of the LM training data can be converted into a phoneme sequence before proceeding to the subsequent blocks of the routine 100. The remainder of the LM training data can then be converted at block 104 in parallel with the execution of the subsequent blocks of the routine 100 on the previously converted subset of LM training data.

In block 106, augmented phoneme sequences are generated for the portion of the language model training text by determining likely acoustic errors as alternate hypotheses. In some embodiments, the generated phoneme sequence generated in block 104 may form the basis of a lattice of alternate hypotheses. Each path may represent an augmented phoneme sequence. In some embodiments, an n-best list may be generated that includes the n most likely acoustic errors. In some embodiments, each path through the lattice or each hypothesis in the n-best list may be associated with a probability.

Any method known to one of skill in the art may be used to determine likely acoustic errors. For example, in some embodiments, a confusion matrix may be used to add alternate paths to the generated phoneme sequence. The alternate paths may include substituting one phoneme for another, inserting a phoneme, deleting a phoneme, or any combination thereof. More information on the use of a confusion matrix for generating alternate hypotheses may be found in U.S. patent application Ser. No. 13/531,376, filed Jun. 22, 2012 and titled "MODELLING EXPECTED ERRORS FOR DISCRIMINATIVE TRAINING," the disclosure of which is hereby incorporated by reference in its entirety. For example, a confusion matrix may be applied to the phonemes that constitute "cat is sleeping" to identify likely acoustic errors for "cat is sleeping."

In other embodiments, acoustic data may be available for use with the language model training corpus. For example, the language model training corpus could be converted to audio using text-to-speech and then speech recognition could be applied to create multiple recognition hypotheses such as a lattice. In some embodiments, text-to-speech may be performed with multiple voices (e.g., male, female, young, old, etc.) or with different text-to-speech algorithms (e.g., concatenative, synthetic, etc.) to have greater variability in the speech recognition output.

In block 108, the augmented phoneme sequences may be converted into likely word errors. For example, some augmented phoneme sequences may create a sequence of phonemes that do not correspond to any words. Dictionaries, lookup tables, lexicons, or the like may be used to separate phoneme sequences that correspond to words from phoneme sequences that do not correspond to words. Any method known to one of skill in the art may be used to convert the likely acoustic errors to likely word errors. In some embodiments, the output may be a lattice that includes the original words and likely word errors. In some embodiments, the output may be an n-best list of word hypotheses. These word errors may be generated based on alternate phoneme hypotheses as discussed above. Returning to the "cat is sleeping" example, the list of like word errors might include "cat is sweeping," "Pat is sleeping," and "Pat is sweeping."

As shown in block 110, the previously described routine may be repeated for every portion of the language model training text. In the example above, the language model training text may be separated into portions, such as a sentence or other logical separation. Separating the language model training text into portions or subsets can help to prevent the lattice generated in blocks 106 and 108 from becoming too large to work with effectively. In some embodiments, larger amounts of text may be processed in a single execution of the previously described blocks, up to and including the entire corpus of language model training text. Once all of the training text has been processed, the illustrative routine 100 finishes in block 112.

Illustrative Routines for Discriminatively Pruning a Language Model

Figure 2A:
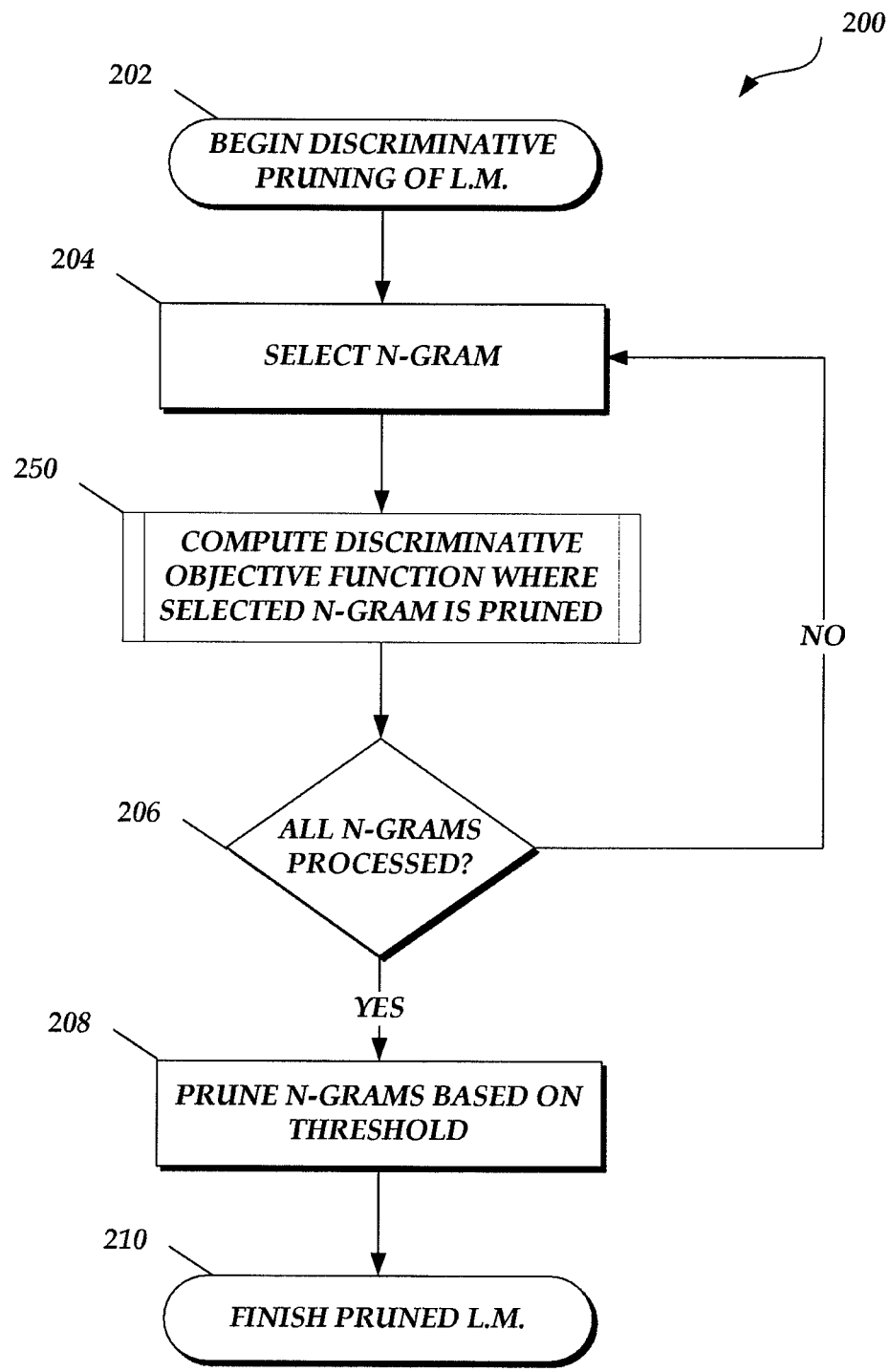
FIG. 2A is a flow diagram depicting an illustrative routine for generating a discriminatively pruned language model.

Turning to FIG. 2A, an illustrative routine 200 for discriminatively pruning a base language model to generate a discriminatively pruned language model is shown. As discussed above, the base language model may be generated by the model pruning service itself, or a previously generated base language model may be provided to the model pruning service. The illustrative routine 200 begins in block 202. In block 204, an n-gram from the base language model is selected. A subroutine 250 may be called for the n-gram to determine its respective discriminative objective function value for a hypothetical language model in which only the n-gram selected in block 204 is pruned. The subroutine 250 is discussed further with respect to FIG. 2B.

As shown in block 206, the subroutine 250 may be called for each n-gram in the base language model. Once the discriminative objective function value has been computed for each of the n-grams in the base language model, n-grams may be selected to be pruned based on a threshold as shown in block 208. In some embodiments, the n-grams in the base language model are ranked by their discriminative objective function values. In one embodiment, a threshold value is set, and all n-grams whose discriminative objective function values satisfy the threshold value are pruned. In another embodiment, the ranked n-grams are pruned based on a percentage threshold. For example, n-grams whose discriminative objective function values place them in the top 10% of all n-grams may be pruned. The illustrative routine 200 may finish in block 210, a discriminatively pruned language model having been generated by pruning n-grams from the base language model based on their discriminative objective function values.

Figure 2B:
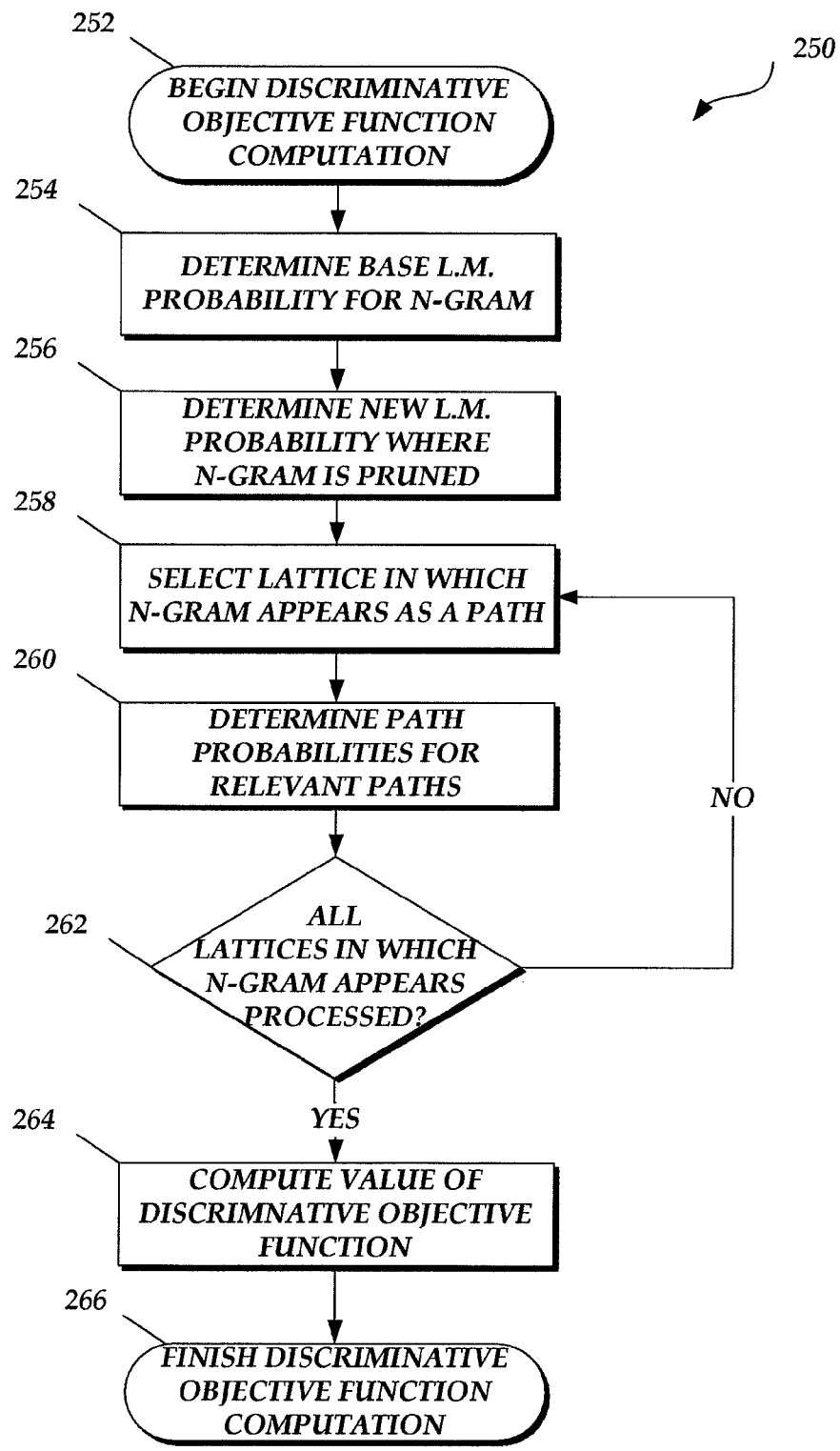
FIG. 2B is a flow diagram depicting an illustrative subroutine for computing a discriminative objective function value for use with pruning a language model.

Turning to FIG. 2B, an illustrative subroutine 250 is shown. The subroutine 250 begins at block 252. In block 254, the base language model probability for the selected n-gram may be determined. As discussed above, the base language model may refer to any language model that is to be discriminatively pruned by the model pruning service, including language models that have been previously pruned according to either aspects of the present disclosure or according to entropy-based or other techniques known in the art. Generally described, this probability may be measured by computing the conditional probability that the final word of the n-gram appears in the training text given that the previous words of the n-gram have appeared. For example, the probability of the trigram "cat is sleeping" is the probability that the word "sleeping" appears given that the words "cat is" appear immediately prior to the word sleeping. Put another way, the probability of the "cat is sleeping" trigram can be represented as P(sleeping|cat, is).

In block 256, a new language model probability for the selected n-gram may be determined by considering the n-gram's probability in a language model in which only the selected n-gram is pruned. The new probability may be determined by applying a backoff penalty to an (n−1)-gram that omits the first word of the n-gram. Returning to the above example, the new language model probability for "cat is sleeping" in a hypothetical language model in which the trigram "cat is sleeping" is pruned may be determined by applying a penalty to the probability of the bigram "is sleeping." In formal terms, P(sleeping|cat, is) in the language model may be replaced by $\alpha$*P(sleeping|is). The backoff penalty $\alpha$ may vary based on the chosen backoff strategy. Many types of backoff strategies may be used, such as Kneser-Ney, among others. Smoothing techniques, such as Good-Turing, may also be used in conjunction with a selected backoff strategy.

In block 258, a lattice in which the selected n-gram appears as part of a path may be selected. As discussed above, a lattice may be generated to represent alternative hypotheses (e.g., with likely word errors) for a given text. In some lattices, the selected n-gram may appear in the path corresponding to the original text (e.g., the original text contained the words of the n-gram in sequence). In other lattices, the selected n-gram may appear in a path corresponding to a likely word error (e.g., the original text did not contain the words of the n-gram in sequence). In some embodiments, block 258 may operate on a data structure other than a lattice, such as an N-best list.

An example will prove illustrative. "Cat is sleeping" may be a text from the language model training corpus, and likely word errors may be generated from this text using the procedure described above. Likely word errors for this text may include "cat is sweeping" and "Pat is sleeping." A lattice or other data structure may be created that includes the original text and the likely word errors. In another example, "Pat is sweeping" may be a text from the language model training corpus. Likely word errors for this text may include "Pat is sleeping" and "cat is sleeping." Another lattice or other data structure may be created that includes the original text and the likely word errors. Note that the phrase "cat is sleeping" appears in one lattice as corresponding to an actual language model training text and appears in another lattice is a likely word error for a different language model training text.

In block 260, the probabilities for the relevant paths through a lattice in which the n-gram appears may be determined. These paths may include paths where the n-gram is the truth (e.g., the n-gram matches the original text) and may also include paths where the n-gram is an alternate hypothesis for the original text. In one embodiment, the probabilities of these paths are based on the normalized product of the probability of each phoneme along the path. Path probabilities are discussed in greater detail below with respect to FIG. 3C.

In block 262, the model pruning service determines if all lattices in which the n-gram appears have been processed. If so, in block 264, the discriminative objective function value may be computed for the selected n-gram.

In one embodiment, the discriminative objective function value Z for the selected n-gram is substantially equivalent to:

$$Z(\text{n-gram}) = \sum_{\text{true path } i \text{ with n-gram}} \{p_{prn}(\text{path}_i)\log P_{prn}(\text{n-gram}) -$$

$$p_{base}(\text{path}_i)\log P_{base}(\text{n-gram})\} -$$

$$\sum_{\text{error paths } i \text{ with n-gram}} \{p_{prn}(\text{path}_i)\log P_{prn}(\text{n-gram}) -$$

$$p_{base}(\text{path}_i)\log P_{base}(\text{n-gram})\}$$

Wherein $P_{base}(\text{n-gram})$ is the probability of the n-gram in the base language model, and $p_{base}(\text{path}_i)$ is the probability of a given path i containing the selected n-gram in a lattice using $P_{base}$; $p_{prn}(\text{path}_i)$ and $P_{prn}$ (n-gram) are the corresponding path and n-gram probabilities using a hypothetical pruned language model in which only the n-gram is pruned. Pruning an n-gram may affect its path probability in addition to its language model probability, for which the above expression is a possible approach. It will additionally be recognized that the logarithm base may be selected as desired.

In another embodiment, an approach may be taken in which it is assumed that the path probability for an n-gram is not substantially changed by the act of pruning. In this embodiment, the discriminative objective function value Z for the selected n-gram is substantially equivalent to:

$$Z(\text{n-gram}) =$$

$$\sum_{\text{true path } i \text{ with n-gram}} p_{base}(\text{path}_i)\{\log P_{prn}(\text{n-gram}) - \log P_{base}(\text{n-gram})\} -$$

$$\sum_{\text{error paths } i \text{ with n-gram}} p_{base}(\text{path}_i)\{\log P_{prn}(\text{n-gram}) - \log P_{base}(\text{n-gram})\}$$

Wherein $p_{base}(\text{path}_i)$ is the probability of a given path i containing the selected n-gram in a lattice, and $P_{base}$ (n-gram) is the probability of the n-gram in the base language model; $P_{prn}$ (n-gram) is the n-gram probability in a hypothetical pruned language model in which only the n-gram is pruned. As above, the logarithm base may be chosen as desired. Additionally, a boosting or margin term may be added to the above expressions for the discriminative objective function value, as known to those skilled in the art.

The subroutine 250 then finishes in block 266 after the discriminative objective function value has been computed. This computed value for each n-gram may be used to select n-grams for pruning, as discussed above with respect to FIG. 2A.

Examples of Discriminative Pruning

FIG. 3A and FIG. 3B illustrate the operation of the discriminative objective function with illustrative probabilities for two texts from a language model training corpus. Purely for illustrative purposes, the embodiment of the discriminative objective value function in which the path probability for an n-gram varies in response to pruning is discussed herein. A base set of probabilities 310 is shown in FIG. 3A. The original text is "cat is sleeping," and a lattice with multiple paths may be generated therefrom. Given that "cat is sleeping" is the audio input, a path probability for the audio input being recognized correctly as "cat is sleeping," as well as path probabilities for likely word errors (cat is sweeping, etc.) can be computed as discussed below with respect to FIG. 3C. The "cat is sleeping" trigram may have a language model probability of $P_{base}$ (sleeping|cat, is)=0.025 in the base language model.

Also shown in FIG. 3A is a set of probabilities 320 given that the "cat is sleeping" trigram is pruned. As discussed above, a backoff penalty may be applied to the probability P(sleeping|is) to compute $P_{prn}$ for "cat is sleeping" in a language model in which only the "cat is sleeping" trigram was pruned. Here, $P_{prn}$=0.018. As discussed above, pruning an n-gram in a language model may also affect its path probability, as is known in the art. Here, pruning the "cat is sleeping" n-gram from the language model has reduced the path probability of "cat is sleeping" to $p_{prn}(\text{path})$=0.52. The path probabilities of other paths containing likely word errors may be changed as well as shown in FIG. 3A.

In addition to considering the path probabilities when the n-gram is part of the original text, the path probabilities when the n-gram does not match the original text but are part of a likely word error are also part of the discriminative objective function. FIG. 3B shows a set of probabilities 330 in which "Pat is sweeping" is the original text, and "cat is sleeping" is an alternate hypothesis in FIG. 3A. While the base language model and pruned language probabilities for "cat is sleeping" are the same as in FIG. 3A, the path probabilities for "cat is sleeping" may be different. The path probability may be different because of the way the likely acoustic errors are determined. Here, $p_{base}(\text{path})$ for the alternate hypotheses with "cat is sleeping" is 0.10.

Assuming that these are the only relevant lattices for "cat is sleeping," one example of computing the discriminative objective function value for the trigram "cat is sleeping" is discussed below. The discriminative objective function can be computed using many other techniques, of which the foregoing is merely one example.

The term in the expression above for the lattice in which "cat is sleeping" matches the original text is equal to $p_{prn}$(path)log($P_{prn}$(sleeping|cat,is)-$p_{base}$(path) log($P_{base}$(sleeping|cat, is). Referring to the probabilities shown in FIG. 3A, this term is equal to (0.52)log(0.018)-(0.60)log 0.025.

The term for the lattice in which "cat is sleeping" does not match the original text (e.g., is the result of a likely word error) is equal to $[p_{base}(\text{path})\log(P_{base}(\text{sleeping|cat,is}) - p_{prn}(\text{path})\log(P_{prn}(\text{sleeping|cat, is})]$. Referring to the probabilities shown in the sets of probabilities 330 and 340 FIG. 3B, this term is equal to (0.10)log(0.025)-(0.06)log 0.018).

In one example, the discriminative objective function value is equal to the difference between the two terms described above. Accordingly, the discriminative objective function value for this example is Z(sleeping|cat, is))=(0.52)log (0.018)-(0.60)log 0.025+(0.10)log(0.025)-(0.06)log 0.018.

Advantageously, the discriminative objective function may weight the impact of pruning a given n-gram in situations wherein the selected n-gram is in the right sentence and when it is in an erroneous sentence. Advantageously, n-grams may be selected for pruning such that the n-grams to be pruned have the most positive (or least negative) overall effect on expected word error rate.

FIG. 3C illustrates an example recognition lattice 350 that represents one or more recognition hypotheses for a given audio input or for a text input where a pseudo-ASR procedure has been applied. The lattice 350 includes several paths, with each path including multiple words. Each word in the lattice 350 includes one or more phonemes. Each path through the example lattice 350 can represent one phoneme sequence and the words represented by the phoneme sequence, with words separated by black points and phonemes within words separated by white points. Any number of paths may be generated, and the number of words per path and phonemes per word can vary substantially, depending on the audio recording that is processed.

As discussed above with respect to block 260 in FIG. 2B, each path through the lattice may have a probability, sometimes referred to herein as a path probability. Returning to example lattice 350 of FIG. 3C, one path of the lattice consists of words 360 and 364. Word 360 is composed of phonemes P1 and P2, while word 364 is composed of phonemes P3 and P4. Depending on the implementation, each word or phoneme is associated with a probability. To calculate the path probability of the path defined by words 360 and 364, the probabilities of the phonemes (or words) are multiplied across the entire path and normalized. For example, assuming phoneme P1 is associated with a probability of $X_1$, P2 with a probability of $X_2$, P3 with a probability of $X_3$, and P4 with a probability of $X_4$, the total probability of the path is the product $X_1*X_2*X_3*X_4$. In some embodiments, this product may also include other probabilities, such as language model probabilities. This operation is repeated for each path through the lattice 350. When a product for each path has been computed, the products are added together to compute a total for the lattice 350. The total probability associated with each path may then be normalized over the total for the lattice 350. Returning to the previous example, the probability associated with the path defined by words 360 and 364 ($X_1*X_2*X_3*X_4$) is placed in the numerator and the total for the lattice 350 is placed in the denominator, with the resulting ratio representing the path probability. To compute the probability associated with the alternate hypothesis path defined by words 362 and 368, in some embodiments, a ratio may be formed with ($X_1*X_3*X_2*X_5*X_4$) in the numerator and the total for the lattice 350 in the denominator.

The normalized probability for the path may be assigned to each segment of the path. In the example above, the normalized probability for the path is assigned to both word 360 and word 364. Due to the structure of the lattice 350, each segment may be, and typically is, part of multiple paths. For example, word 360 partially defines the path of the previous example and, in conjunction with word 366, it defines a separate path. In such cases, the total probability of the segment is the sum of the probabilities for each path on which it lies, because a segment which is included in multiple hypotheses has a greater probability of being correct than any individual hypothesis in which it is included.

As discussed above, the lattice may have multiple paths with a true path corresponding to the original text and alternative hypotheses corresponding to likely word errors. Original text 370 may include words 372 and 374. The path indicated by the words 360 and 364 may indicate the correct path for the original text through the lattice if the words match. In the illustrative lattice 350, phonemes may be substituted, added, or deleted in an alternate hypothesis, such as that indicated by words 362 and 368.

Illustrative Operating Environment

Figure 4:
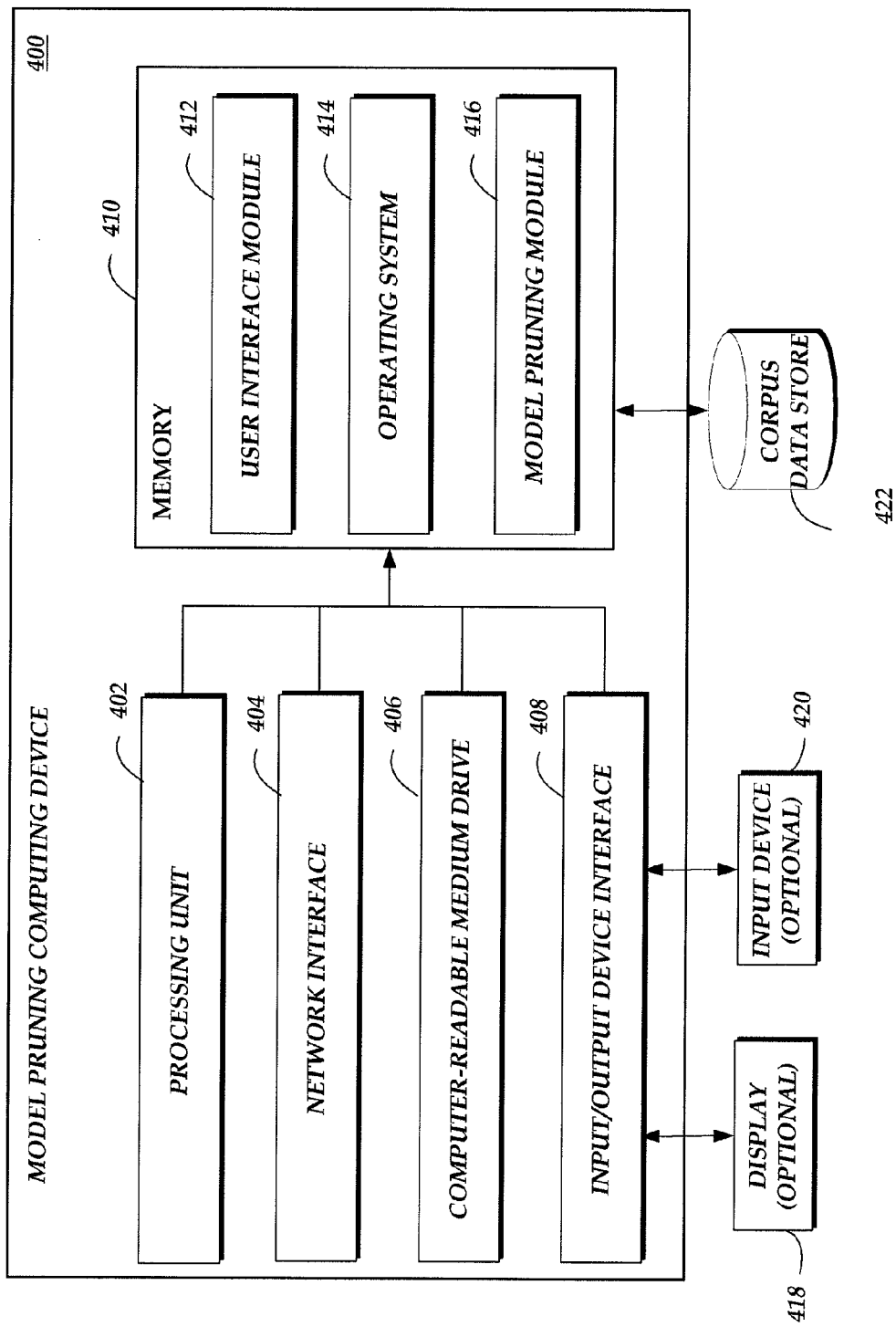
FIG. 4 is a schematic diagram of an illustrative model pruning computing device.

Turning to FIG. 4, an illustrative computing device 400 for use with discriminatively pruning a language model is shown. The computing device 400 includes an arrangement of computer hardware and software components that may be used to implement aspects of the present disclosure. Those skilled in the art will appreciate that the computing device 400 may include more (or fewer) components than those shown in FIG. 4. It is not necessary, however, that all of these generally conventional components be shown in order to provide an enabling disclosure.

The computing device 400 includes a processing unit 402, a network interface 404, a non-transitory computer-readable medium drive 406, and an input/output device interface 408, all of which may communicate with one another by way of a communication bus. As illustrated, the computing device 400 is optionally associated with, or in communication with, an optional display 418 and an optional input device 420. The display 418 and input device 420 may be used in embodiments in which users interact directly with the computing device 400 (e.g., when the computing device 400 is represented in a user computing device). The network interface 404 may provide the model pruning computing device 400 with connectivity to one or more networks or computing systems. The processing unit 402 may thus receive information and instructions (such as utterances, language models, and text) from other computing systems or services via a network. The processing unit 402 may also communicate to and from memory 410 and further provide output information for an optional display 418 via the input/output device interface 408. The input/output device interface 408 may accept input from the optional input device 420, such as a keyboard, mouse, digital pen, touch screen, or gestures recorded via motion capture. The input/output device interface 420 may also output audio data to speakers or headphones (not shown) or receive audio input (such as an utterance) from a microphone or receiver.

The memory 410 contains computer program instructions that the processing unit 402 executes in order to implement one or more embodiments of the present disclosure. The memory 410 generally includes RAM, ROM and/or other persistent or non-transitory computer-readable storage media. The memory 410 may store an operating system 414 that provides computer program instructions for use by the processing unit 402 in the general administration and operation of the model pruning computing device 400. The memory 410 may further include other information for implementing aspects of the present disclosure. For example, in one embodiment, the memory 410 includes a user interface module 412 that facilitates generation of user interfaces (such as by providing instructions therefor) for display upon a computing device.

In addition, memory 410 may include or communicate with the corpus data store 422. The corpus data store 422 may contain a body of text (or "corpus") from which a language model may be generated and pruned. The corpus data store 422 may also store one or more language models. The corpus and/or language models may relate to one language, such as English, or may relate to multiple languages. The corpus data store 422 may be embodied in hard disk drives, solid state memories, and/or any other type of non-transitory computer-readable storage medium accessible to the computing device 400. The corpus data store 422 may also be distributed or partitioned across multiple storage devices as is known in the art without departing from the spirit and scope of the present disclosure.

In addition to the user interface module 412, the memory 410 may include a model pruning module 416 that may be executed by the processing unit 402. In one embodiment, the model pruning module 416 implements aspects of the present disclosure. For example, the model pruning module 416 may be used to generate a base language model from a corpus of text stored in the corpus data store 422 and prune the language model. In some embodiments, the model pruning module may also be configured to transcribe audio inputs such as utterances using a pruned language model; generate text documents, text messages, instant messages, or electronic mail messages from transcribed audio inputs; transmit transcriptions of audio inputs (which may be incorporated into text documents, text messages, instant messages, or electronic mail messages) over a network; and perform other operations.

The computing device 400 may be embodied in a variety of environments, and may be represented as a single computing device or as multiple computing devices. For example, in some embodiments, the computing device 400 is implemented as one or more backend servers capable of communicating over a network. In other embodiments, the computing device 400 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the computing device 400 may be represented as a user computing device capable of communicating over a network, such as a laptop or tablet computer, personal computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like.

Figure 5:
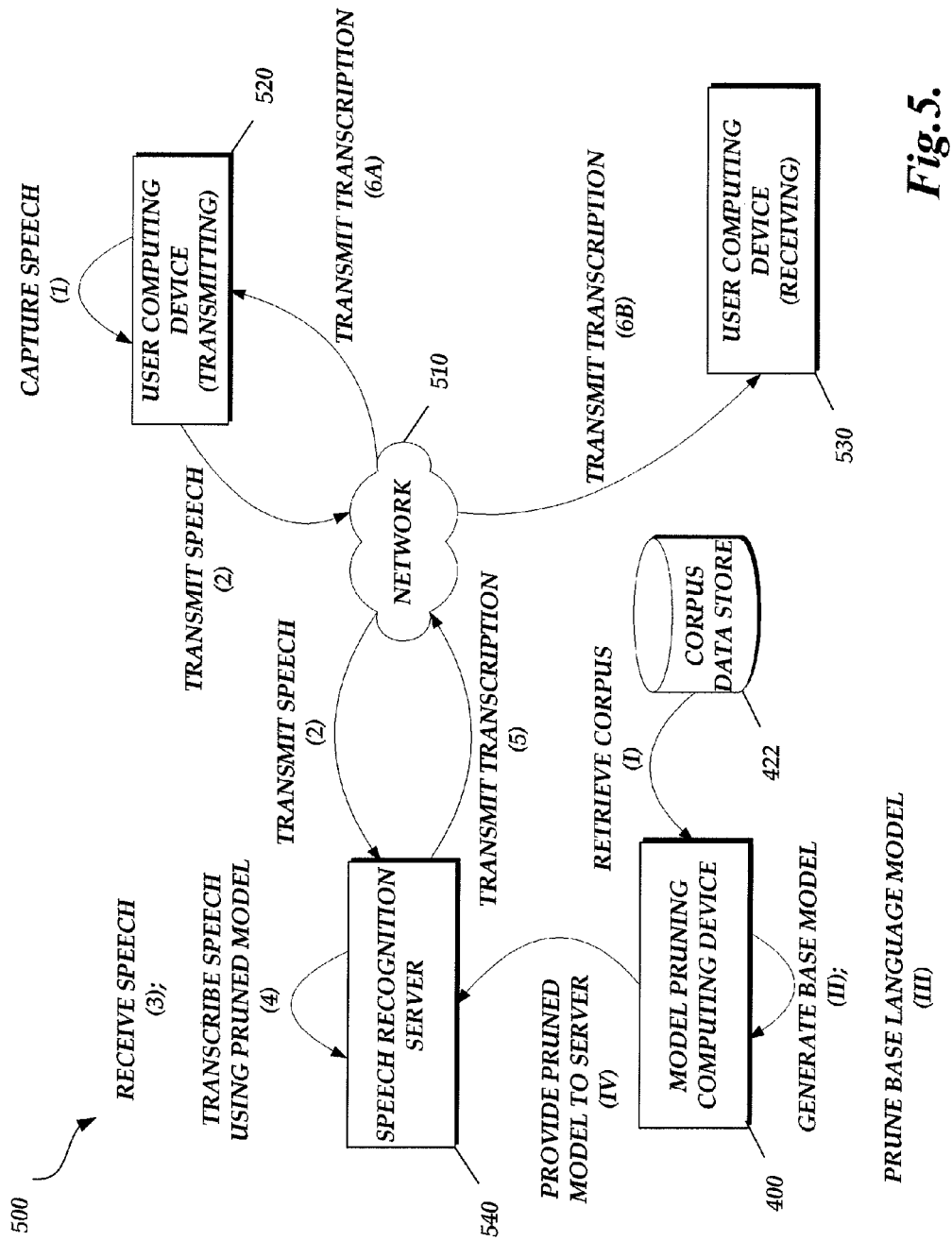
FIG. 5 is a state diagram depicting illustrative operations of a distributed speech recognition system in an illustrative network environment.

FIG. 5 depicts several example operations that may be performed by the model pruning service in an illustrative network environment 500. While two separate example operations are discussed herein, other operations are possible and within the scope of this disclosure.

In one operation, the computing device 400 may retrieve a corpus of text (I) from the corpus data store 422. The computing device 400 may then generate a base language model (II) from the corpus of text using techniques known in the art. The base language model may be discriminatively pruned (III) by the computing device 400 as discussed above. The pruned language model may then be provided (IV) to a speech recognition server 540 for use with a distributed speech recognition service. More information on speech recognition servers 540 and distributed speech recognition services may be found in U.S. Pat. No. 8,117,268, entitled "Hosted voice recognition system for wireless devices" and issued on Feb. 14, 2012. The disclosure of U.S. Pat. No. 8,117,268 is hereby incorporated by reference in its entirety.

Those skilled in the art will recognize that the example operation indicated by states I, II, III, and IV may be performed one time only or may be performed repeatedly (e.g., to generate and/or provide multiple pruned language models to the speech recognition server 540). Additionally, in some embodiments, no base language model need be generated. Rather, a base language model may be stored in the corpus data store 422, retrieved therefrom by the computing device 400, and then discriminatively pruned (III) and provided as a pruned language model (IV) to the speech recognition server 540.

In another operation, a transmitting user computing device 520 may capture an audio input (1), such as speech spoken by a user. The transmitting user computing device may then transmit the captured audio input as audio data (2) over the network 510. Upon receiving the speech (3), the speech may be transcribed into text (4) and incorporated into a text message, text document, instant message, electronic mail message, or other form of text by the speech recognition server 540. The speech recognition server 540 may transmit the transcribed text (5) over the network 510 to the transmitting user computing device 520 (6A) for review and confirmation at the transmitting user computing device 520 (e.g., by displaying a user interface on a screen of the transmitting user computing device 520 requesting that the user confirm that the displayed transcription is correct). The confirmed transcription may then be transmitted from the transmitting user computing device 520 over the network 510 to the recipient user computing device 530. Alternately, the speech recognition server 540 may transmit the transcribed text directly to a recipient user computing device 530 (6B), which may have been designated as a recipient computing device 530 by a user of the transmitting user computing device 520. More information on this example operation may be found in U.S. Pat. No. 8,117,268, entitled "Hosted voice recognition system for wireless devices" and issued on Feb. 14, 2012, previously incorporated by reference above. Generally described, the speech recognition server 540 may be configured to transcribe utterances using a pruned language model; generate text documents, text messages, instant messages, or electronic mail messages from transcribed utterances; transmit transcriptions of utterances (which may be incorporated into text documents, text messages, instant messages, or electronic mail messages) over a network; and perform other operations. Similar functionality may be provided in the transmitting user computing device 520 and in the recipient computing device 530.

It should be noted that the transmitting user computing device 520 and the recipient user computing device 530 may be any device capable of communicating over the network 510. For example, these computing devices may be represented as a user computing device capable of communicating over a network, such as a laptop or tablet computer, personal computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The transmitting user computing device 520 and transmitting user computing device 530 may also include some or all of the components present in the model pruning computing device 400 (such as a model pruning module 416), as discussed above with respect to FIG. 4.

It should also be noted that the network 510 may be any type of network that facilitates electronic communication between computing devices. For example, the network 510 may be any wired network, wireless network or combination thereof. In addition, the network 510 may be a personal area network, local area network, wide area network, cable network, satellite network, cellular telephone network, or combination thereof. Protocols and components for communicating via the Internet or any of the other aforementioned types of communication networks, such as the TCP/IP protocols, can be used in the network 510.

It will be recognized that many of the devices described above are optional and that embodiments of the environment 500 may or may not combine devices. Furthermore, devices need not be distinct or discrete. Devices may also be reorganized in the environment 500. For example, the computing device 400 and the speech recognition server 540 may each be represented as single physical server or, alternatively, may be split into multiple physical servers. The computing device 400 and the speech recognition server 540 may be combined into a single computing device as well. Entire operations may be performed by a single user computing device as well. For example, a user computing device may be capable of generating and pruning language models, may be capable of transcribing speech using a pruned language model, and/or may be capable of transmitting transcriptions over the network 510.

Terminology

Many of the operations of the present disclosure are sufficiently mathematically or technically complex that one or more computing devices may be necessary to carry them out. As discussed above, generating and/or discriminatively pruning a language model effectively requires resort to a computing device owing to the volume and complexity of the calculations involved. Additionally, a computing device may also be required to generate speech recognition results and to communicate over a network.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for discriminatively pruning a language model, the system comprising:
   an electronic data store configured to store a corpus of training texts; and
   a computing device in communication with the electronic data store, the computing device configured to:
      obtain a confusion matrix of confusable phonemes;
      for a first text of the corpus of training texts, compute a first word lattice comprising the first text and an alternative hypothesis for the first text, wherein the first text comprises a first word;
      for a second text of the corpus of training texts, compute a second word lattice comprising the second text and an alternative hypothesis for the second text using the confusion matrix, wherein the second text comprises a second word, and wherein the alternative hypothesis for the second text comprises the second text with the first word substituted for the second word;
      obtain a language model comprising a plurality of trigrams;
      for a first trigram of the plurality of trigrams, wherein the first trigram comprises the first word in a context of two other words, determine a plurality of values using the language model without pruning the first trigram, the plurality of values comprising:
         a trigram probability for the first trigram;
         a backoff probability for the first trigram, wherein the backoff probability is computed using a backoff weight and a bigram probability, and wherein the backoff probability corresponds to a probability used in the absence of the trigram probability;
         a true path probability that a first true path of the first word lattice is correct, wherein the first true path comprises the first text; and an error path probability that a first error path of the second word lattice is correct, wherein the first error path the alternative hypothesis for the second text;

compute a discriminative objective function value using the plurality of values, wherein the discriminative objective function value is based at least partly on a difference between (i) a first sum of values computed for individual true paths including the first true path, and (ii) a second sum of values computed for individual error paths including the first error path, wherein the value computed for the first true path is computed using the true path probability, the tri-gram probability and the backoff probability, and wherein the value computed for the first error path is computed using the error path probability, the tri-gram probability and the backoff probability;

based at least in part on the discriminative objective function value, prune the first trigram from the language model to generate a pruned language model;

receive, from a user computing device, an audio signal corresponding to speech of a user; and recognize the speech, via a speech recognition server, using the pruned language model.

2. The system of claim 1, wherein the computing device is further configured to prune the first trigram from the language model to generate the pruned language model by comparing the discriminative objective function value to a threshold.

3. The system of claim 1, wherein the confusion matrix comprises a plurality of confusion probabilities, and wherein individual confusion probabilities of the plurality of confusion probabilities comprise a probability that a phoneme of the language is recognized as a different phoneme of the language.

4. The system of claim 1, wherein the computing device is further configured to:

generate a phoneme sequence corresponding to the second word, the phoneme sequence comprising a second phoneme;

select a first phoneme from the confusion matrix based at least on a probability that the second phoneme is recognized as the first phoneme being greater than a probability that the second phoneme is recognized as at least one other phoneme;

substitute the first phoneme for the second phoneme in the phoneme sequence to generate an alternate phoneme sequence; and generate the first word from alternate phoneme sequence, wherein the erroneous hypothesis for the second text comprises the first word generated from the alternate phoneme sequence.

5. A computer-implemented method comprising:

as implemented by one or more computing devices configured with specific computer-executable instructions, obtaining a confusion probability that a first phoneme is recognized as a second phoneme;

obtaining a first text comprising a first word;

obtaining a second text comprising a second word;

generating, using the confusion probability, an erroneous hypothesis for the second text, wherein generating the erroneous hypothesis comprises substituting the first word for the second word in the second text;

obtaining a language model comprising a plurality of n-grams;

for a first n-gram of the plurality of n-grams, wherein the n-gram comprises the first word in a context of one or more other words, determining a plurality of values using the language model, wherein the language model comprises the first n-gram, the plurality of values comprising:

an n-gram probability for the first n-gram;

a backoff probability for the first n-gram;

a first probability that a true hypothesis comprising the first text is correct; and a second probability that the erroneous hypothesis is correct;

computing an objective function value using the plurality of values, wherein the objective function value is based at least partly on a difference between (i) a first sum of values computed for individual true hypotheses including the true hypothesis and (ii) a second sum of values computed for individual erroneous hypotheses including the erroneous hypothesis, wherein the value computed for the true hypothesis is computed using the first probability, the n-gram probability and the backoff probability, and wherein the value computed for the erroneous hypothesis is computed using the second probability, the n-gram probability, and the backoff probability;

based at least in part on the objective function value, pruning the first n-gram from the language model to generate a pruned language model; and recognizing user speech using the pruned language model and an audio signal corresponding to speech of a user.

6. The computer-implemented method of claim 5, wherein:

the first probability is computed using the n-gram probability; and the second probability is computed using the backoff probability.

7. The computer-implemented method of claim 5, wherein pruning the first n-gram from the language model to generate a pruned language model using the objective function value comprises comparing the objective function value to a threshold.

8. The computer-implemented method of claim 5, wherein:

the n-gram is a trigram; and the backoff probability corresponds to a probability used in the absence of the n-tram probability and is computed using a backoff weight and a bigram probability.

9. The computer-implemented method of claim 5, wherein the erroneous hypothesis is an entry in an n-best list of hypotheses.

10. The computer-implemented method of claim 5, further comprising using the objective function value to evaluate a difference between use of the language model with the n-gram and use of the language model without the n-gram.

11. The computer-implemented method of claim 5, further comprising:

generating a phoneme sequence corresponding to the second word, the phoneme sequence comprising the first phoneme;

selecting the second phoneme from a plurality of phonemes based at least on the confusion probability being greater than an additional confusion probability that the first phoneme is recognized as an additional phoneme;

substituting the second phoneme for the first phoneme in the phoneme sequence to generate an alternate phoneme sequence; and generating the first word from the alternate phoneme sequence, wherein the erroneous hypothesis comprises the first word generated from the alternate phoneme sequence.

12. The computer-implemented method of claim 5, wherein the value computed for the true hypothesis is computed by multiplying the first probability by a difference of (i) a logarithm of the n-gram probability and (ii) a logarithm of the backoff probability.

13. The computer-implemented method of claim 5, wherein the true hypothesis comprises a phoneme sequence, and wherein the erroneous hypothesis comprises a phoneme sequence that is acoustically confusable for the phoneme sequence of the true hypothesis.

14. A system comprising:
an electronic data store configured to store a language model comprising a plurality of n-grams; and
a computing device in communication with the electronic data store, the first computing device configured to:
obtain a confusion probability that a first phoneme is recognized as a second phoneme;
obtain a first text comprising a first word;
obtain a second text comprising a second word;
generate, using the confusion probability, an erroneous hypothesis for the second text, wherein generating the erroneous hypothesis comprises substituting the first word for the second word in the second text;
for a first n-gram of the plurality of n-grams, wherein the n-gram comprises the first word in a context of one or more other words, compute a plurality of values using the language model, wherein the language model comprises the first n-gram, the plurality of values comprising:
an n-gram probability for the first n-gram,
a backoff probability for the first n-gram,
a first probability that a true hypothesis comprising the first text is correct; and
a second probability that the erroneous hypothesis is correct;
compute an objective function value using the plurality of values, wherein the objective function value is based at least partly on a difference (i) a first sum of values computed for individual true hypotheses including the true hypothesis, and (ii) a second sum of values computed for individual erroneous hypotheses including the erroneous hypothesis, wherein the value computed for the true hypothesis is computed using the first probability, the n-gram probability and the backoff probability, and wherein the value computed for the erroneous hypothesis is computed using the second probability, the n-gram probability, and the backoff probability;
based at least in part on the objective function value, prune the first n-gram from the language model to generate a pruned language model; and
recognize user speech using the pruned language model and an audio signal corresponding to speech of a user.

15. The system of claim 14, wherein:
the first probability is computed using the n-gram probability; and
the second probability is computed using the backoff probability.

16. The system of claim 14, wherein:
the electronic data store is further configured to store a corpus of training text; and
the computing device is further configured to generate, from the corpus of training text, the language model.

17. The system of claim 15, wherein the corpus of training text comprises at least one of a plurality of electronic mail messages; a plurality of text messages; a plurality of instant messages; and a plurality of text documents.

18. The system of claim 14, wherein the first n-gram is only pruned from the language model to generate a pruned language model if the objective function value does not satisfy a threshold.

19. The system of claim 14, wherein:
the n-gram is a trigram; and
the backoff probability corresponds to a probability used in the absence of the n-tram probability and is computed using a backoff weight and a bigram probability.

20. The system of claim 14, wherein the erroneous hypothesis is an entry in an n-best list of hypotheses.

21. The system of claim 14, wherein the computing device is further configured to:
generate a phoneme sequence corresponding to the second word, the phoneme sequence comprising the first phoneme;
select the second phoneme from a plurality of phonemes based at least on the confusion probability being greater than an additional confusion probability that the first phoneme is recognized as an additional phoneme;
substitute the second phoneme for the first phoneme in the phoneme sequence to generate an alternate phoneme sequence; and
generate the first word from the alternate phoneme sequence, wherein the erroneous hypothesis comprises the first word generated from the alternate phoneme sequence.

22. The system of claim 14, wherein the value computed for the true hypothesis is computed by multiplying the first probability by a difference of (i) a logarithm of the n-gram probability and (ii) a logarithm of the backoff probability.

23. A non-transitory computer-readable medium having a computer-executable component, the computer-executable component being configured to:
obtain a confusion probability that a first phoneme is recognized as a second phoneme;
obtain a first text comprising a first word;
obtain a second text comprising a second word;
generate, using the confusion probability, an erroneous hypothesis for the second text, wherein generating the erroneous hypothesis comprises substituting the first word for the second word in the second text;
for a first n-gram of a language model, wherein the first n-gram comprises the first word in a context of one or more other words, determine a plurality of values using the language model, wherein the language model comprises the first n-gram, the plurality of values comprising:
an n-gram probability for the first n-gram;
a backoff probability for the first n-gram;
a first probability that a true hypothesis comprising the first text is correct; and
a second probability that the erroneous hypothesis is correct;
compute an objective function value using the plurality of values, wherein the objective function value is based at least partly on a difference (i) a first sum of values computed for individual true hypotheses including the true hypothesis, and (ii) a second sum of values computed for individual erroneous hypotheses including the erroneous hypothesis, wherein the value computed for the true hypothesis is computed using the first probability, the n-gram probability and the backoff probability, and wherein the value computed for the erroneous hypothesis is computed using the second probability, the n-gram probability, and the backoff probability;

based at least in part on the objective function value, prune the first n-gram from the language model to generate a pruned language model; and recognize user speech using the pruned language model and an audio signal corresponding to speech of a user.

24. The non-transitory computer-readable medium of claim 23, wherein:
the first probability is computed using the n-gram probability; and
the second probability is computed using the backoff probability.

25. The non-transitory computer-readable medium of claim 23, wherein:
the n-gram is a trigram; and
the backoff probability corresponds to a probability used in the absence of the n-tram probability and is computed using a backoff weight and a bigram probability.

26. The non-transitory computer-readable medium of claim 23, wherein the first n-gram is only pruned from the language model if the objective function value does not satisfy a threshold.

27. The non-transitory computer-readable medium of claim 23, wherein the computer-executable component is further configured to:
for a second n-gram of the language model, wherein the second n-gram corresponds to the second word in a context of other words, compute a second objective function value based at least in part on:
an n-gram probability for the second n-gram;
a backoff probability for the second n-gram;
the second probability that the erroneous hypothesis is correct; and
a third probability that a second true hypothesis comprising the second text is correct; and
based at least in part on the second objective function value, prune the second n-gram from the language model.

28. The non-transitory computer-readable medium of claim 23, wherein the computer-executable component is further configured to use the objective function value to evaluate a difference between use of the language model with the n-gram and use of the language model without the n-gram.

29. The non-transitory computer-readable medium of claim 23, wherein the computer-executable component is further configured to:
generate a phoneme sequence corresponding to the second word, the phoneme sequence comprising the first phoneme;
select the second phoneme from a plurality of phonemes based at least on the confusion probability being greater than an additional confusion probability that the first phoneme is recognized as an additional phoneme;
substitute the second phoneme for the first phoneme in the phoneme sequence to generate an alternate phoneme sequence; and
generate the first word from the alternate phoneme sequence, wherein the erroneous hypothesis comprises the first word generated from the alternate phoneme sequence.

30. The non-transitory computer-readable medium of claim 23, wherein the value computed for the true hypothesis is computed by multiplying the first probability by a difference of (i) a logarithm of the n-gram probability and (ii) a logarithm of the backoff probability.

* * * * *